United States Patent
Fukumizu et al.

(10) Patent No.: US 10,290,888 B2
(45) Date of Patent: May 14, 2019

(54) METHOD OF OPERATING FUEL CELL SYSTEM WITH PERFORMANCE RECOVERY CONTROL

(71) Applicant: HONDA MOTOR CO., LTD., Minato-Ku, Tokyo (JP)

(72) Inventors: Takao Fukumizu, Utsunomiya (JP); Masahiro Mohri, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 292 days.

(21) Appl. No.: 14/813,079

(22) Filed: Jul. 29, 2015

(65) Prior Publication Data

US 2016/0036076 A1  Feb. 4, 2016

(30) Foreign Application Priority Data

Aug. 1, 2014 (JP) ................. 2014-157666
Jul. 15, 2015 (JP) ................. 2015-141120

(51) Int. Cl.
| | |
|---|---|
| *H01M 8/04* | (2016.01) |
| *H01M 8/04828* | (2016.01) |
| *H01M 8/04664* | (2016.01) |
| *H01M 8/04089* | (2016.01) |
| *H01M 8/04119* | (2016.01) |

(52) U.S. Cl.
CPC ... *H01M 8/04828* (2013.01); *H01M 8/04679* (2013.01); *H01M 8/04835* (2013.01); *H01M 8/04097* (2013.01); *H01M 8/04141* (2013.01)

(58) Field of Classification Search
CPC ......... H01M 8/04097; H01M 8/04828; H01M 8/04679; H01M 8/04835; H01M 8/04141
See application file for complete search history.

(56) References Cited

U.S. PATENT DOCUMENTS

| | | | |
|---|---|---|---|
| 2005/0100777 A1* | 5/2005 | Gurin ................ | H01M 8/04097 429/415 |
| 2007/0087233 A1* | 4/2007 | Blaszczyk ......... | H01M 8/04097 429/429 |
| 2013/0196240 A1* | 8/2013 | Furusawa ......... | H01M 8/04231 429/429 |
| 2015/0111122 A1 | 4/2015 | Matsusue et al. | |
| 2015/0125772 A1 | 5/2015 | Matsusue et al. | |

FOREIGN PATENT DOCUMENTS

| | | |
|---|---|---|
| JP | 2008-235093 A | 10/2008 |
| JP | 5083642 B2 | 11/2012 |
| JP | 2013-232361 A | 11/2013 |
| WO | 2013/128609 A1 | 9/2013 |
| WO | 2013/128610 A1 | 9/2013 |

\* cited by examiner

*Primary Examiner* — Philip A. Stuckey
(74) *Attorney, Agent, or Firm* — Carrier Blackman & Associates, P.C.; Joseph P. Carrier; Jeffrey T. Gedeon (57) ABSTRACT

An operation method of a fuel cell system includes the step of determining whether or not performance recovery control of a fuel cell stack should be started. This operation method includes the step of, if it is determined that the performance recovery control should be started, supplying water content to a membrane electrode assembly by a water content adjusting device, while maintaining power generation voltage of the fuel cell stack at 0.3 V or lower in a state where an oxygen-containing gas is circulated through a closed circulation channel.

9 Claims, 8 Drawing Sheets

METHOD OF OPERATING FUEL CELL SYSTEM WITH PERFORMANCE RECOVERY CONTROL

CROSS-REFERENCE TO RELATED APPLICATIONS

This application is based upon and claims the benefit of priority from Japanese Patent Applications No. 2014-157666 filed on Aug. 1, 2014 and No. 2015-141120 filed on Jul. 15, 2015, the contents all of which are incorporated herein by reference.

BACKGROUND OF THE INVENTION

Field of the Invention

The present invention relates to a method of operating a fuel cell system equipped with a fuel cell for generating electrical energy by electrochemical reactions of a fuel gas supplied to an anode and an oxygen-containing gas supplied to a cathode.

Description of the Related Art

For example, a solid polymer electrolyte fuel cell employs a polymer ion exchange membrane as an electrolyte membrane. In the fuel cell, the electrolyte membrane is interposed between an anode and a cathode to form a membrane electrode assembly (MEA). The membrane electrode assembly is sandwiched between separators. The membrane electrode assembly and the separators (bipolar plates) sandwiching the membrane electrode assembly make up a power generation cell. In the fuel cell of this type, in use, typically, a predetermined number of the power generation cells are stacked together to form, e.g., an in-vehicle fuel cell stack mounted in a fuel cell electric automobile.

In the fuel cell, in order to achieve good performance in power generation reaction, it is required to maintain the solid polymer electrolyte membrane in a desired humidified state. If the water content in the electrodes is large, water clogging (flooding) may occur in the electrode catalyst and porous carbon, and if the water content in the electrodes is small, the solid polymer electrolyte membrane is dried, and the performance may become poor undesirably.

Therefore, the space in the fuel cell is kept to have a certain humidified state, and impurity ions tend to be eluted from components of the fuel cell. In particular, a large number of sulfate groups for reliably maintaining the desired ion conductivity are provided in the polymer ion exchange membrane of the membrane electrode assembly. Therefore, sulfuric acid ions may be eluted from the polymer ion exchange membrane through water in the fuel cell. When the sulfuric acid ions are retained on the catalyst surface, the power generation performance of the fuel cell may be degraded undesirably.

In an attempt to address the problem, for example, in a fuel cell system disclosed in Japanese Laid-Open Patent Publication No. 2008-235093 (hereinafter referred to as conventional technique 1), a highly humidified gas is supplied to at least one of an oxidizing electrode and a fuel electrode in the fuel cell. According to the disclosure, in this manner, the electrode catalyst layer is washed with the water, and impurities are removed.

Further, in a fuel cell system disclosed in Japanese Laid-Open Patent Publication No. 2013-232361 (hereinafter referred to as conventional technique 2), adjusting means for adjusting the relative humidity of the ambient atmosphere of the catalyst layer to be not more than a predetermined threshold value, prior to implementing the performance recovery process is provided. The adjusting means performs this adjustment by increasing the flow rate of an oxygen-containing gas supplied to the cathode of the fuel cell.

SUMMARY OF THE INVENTION

However, in the conventional technique 1, in order to supply the highly humidified gas, a dedicated highly humidified gas supply pipe is provided separately from an air supply pipe. Therefore, it is required to add a supply system of the highly humidified gas, and the system becomes complicated as a whole.

Further, in the conventional technique 2, it is required to supply a large quantity of the oxygen-containing gas. Therefore, in the presence of the air pump, etc. for supplying the oxygen-containing gas, the energy consumption becomes large, and the efficiency is poor.

The present invention has been made to solve the problem of this type, and an object of the present invention is to provide a method of operating a fuel cell system which makes it possible to simply and economically remove impurity ions, and reliably maintain the desired power generation performance.

A fuel cell system for carrying out an operation method according to the present invention includes a fuel cell, a water content adjusting device, a fuel gas supply apparatus, and an oxygen-containing gas supply apparatus. The fuel cell has a membrane electrode assembly. The membrane electrode assembly includes an anode, a cathode, and a solid polymer electrolyte membrane interposed between the anode and the cathode. The fuel cell generates electrical energy by electrochemical reaction of a fuel gas supplied to the anode and an oxygen-containing gas supplied to the cathode.

The water content adjusting device adjusts water content in the membrane electrode assembly by adjusting the humidity of a reactant gas to be supplied, and the fuel gas supply apparatus supplies the fuel gas. The oxygen-containing gas supply apparatus supplies the oxygen-containing gas, and allows the oxygen-containing gas to be circulated through a closed circulation channel connected to the cathode.

This operation method includes the step of
determining whether or not performance recovery control of the fuel cell should be started. This operation method includes the step of, if it is determined that the performance recovery control should be started, increasing water content to be supplied to the membrane electrode assembly by the water content adjusting device, while maintaining power generation voltage of the fuel cell at 0.3 V or lower in a state where the oxygen-containing gas is circulated through the circulation channel.

In the present invention, by circulating the oxygen-containing gas in the closed circulation channel, the oxygen-containing gas supplied to the fuel cell is kept in an oxygen lean state having a lean oxygen concentration at the stoichiometric ratio less than normal operation. Thus, the power generation voltage of the fuel cell can be set to 0.3 V or lower. In particular, sulfate ions can be removed from the catalyst surface easily.

In this regard, the water content adjusting device supplies water to the membrane electrode assembly. Therefore, impurity ions such as sulfate ions removed from the catalyst surface are contained in the water, and the impurity ions are discharged smoothly and reliably from the fuel cell. Accordingly, it becomes possible to simply and economically remove impurity ions, and reliably maintain the desired power generation performance.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
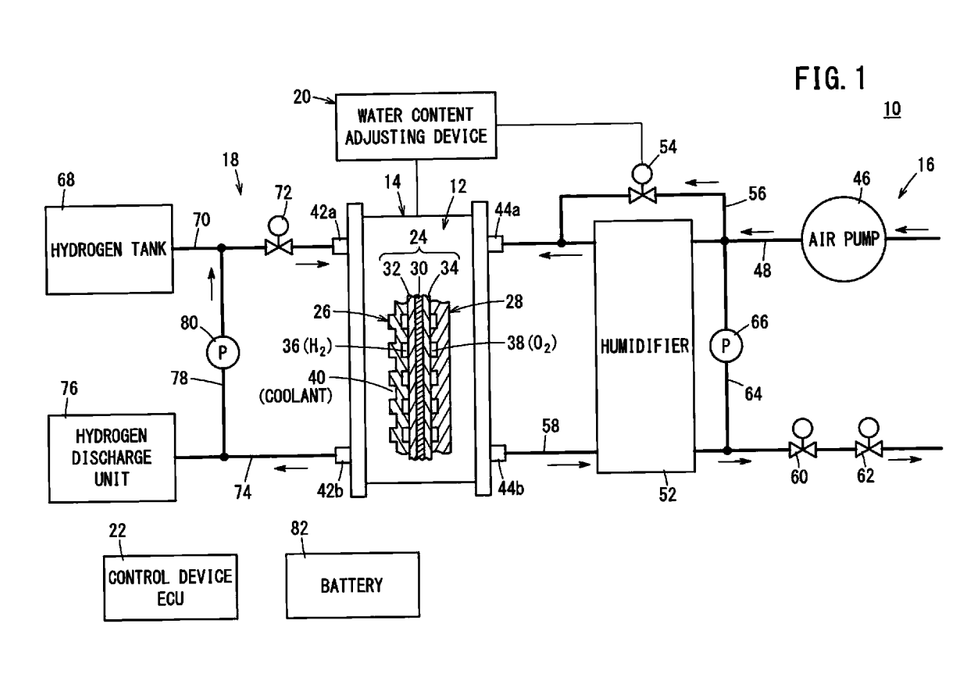
FIG. 1 is a diagram schematically showing structure of a fuel cell system for carrying out an operation method according to a first embodiment of the present invention.

As shown in FIG. 1, a fuel cell system 10 according to an embodiment of the present invention serves as an in-vehicle fuel cell system mounted in an electric vehicle such as a fuel cell electric automobile.

The fuel cell system 10 includes a fuel cell stack 14 formed by stacking a plurality of fuel cells 12, an oxygen-containing gas supply apparatus 16 for supplying an oxygen-containing gas to the fuel cell stack 14, and a fuel gas supply apparatus 18 for supplying a fuel gas to the fuel cell stack 14. Further, the fuel cell system 10 includes a water content adjusting device 20 for adjusting water content in membrane electrode assemblies 24 (described later), and a control device (ECU) 22 for controlling the fuel cell system 10 as a whole.

The fuel cell 12 includes a membrane electrode assembly 24, and a first separator 26 and a second separator 28 sandwiching the membrane electrode assembly 24. The first separator 26 and the second separator 28 are metal separators or carbon separators. The membrane electrode assembly 24 includes an anode 32, a cathode 34, and a solid polymer electrolyte membrane 30 interposed between the anode 32 and the cathode 34. The solid polymer electrolyte membrane 30 is formed by impregnating a thin membrane of perfluorosulfonic acid with water, for example. A fluorine based electrolyte may be used as the solid polymer electrolyte membrane 30. Alternatively, an HC (hydrocarbon) based electrolyte may be used as the solid polymer electrolyte membrane 30.

A fuel gas flow field 36 is formed between the first separator 26 and the membrane electrode assembly 24, for supplying a fuel gas to the anode 32. An oxygen-containing gas flow field 38 is formed between the second separator 28 and the membrane electrode assembly 24, for supplying an oxygen-containing gas to the cathode 34. A coolant flow field 40 is formed between the adjacent first and second separators 26, 28, for supplying the coolant.

The fuel cell stack 14 has a fuel gas supply passage 42a, a fuel gas discharge passage 42b, an oxygen-containing gas supply passage 44a, and an oxygen-containing gas discharge passage 44b. The fuel gas supply passage 42a, the fuel gas discharge passage 42b, the oxygen-containing gas supply passage 44a, and the oxygen-containing gas discharge passage 44b extend through the fuel cell stack 14 in the stacking direction of the fuel cells 12. The fuel gas supply passages 42a and the fuel gas discharge passage 42b are connected to the fuel gas flow field 36 as passages of the fuel gas such as a hydrogen-containing gas (hereinafter also referred to as the hydrogen gas). The oxygen-containing gas supply passage 44a and the oxygen-containing gas discharge passage 44b are connected to the oxygen-containing gas flow field 38 as passages of the oxygen-containing gas (hereinafter also referred to as the air).

The oxygen-containing gas supply apparatus 16 includes an air pump (compressor) 46 for compressing atmospheric air and supplying the compressed air. The air pump 46 is provided for the air supply channel (oxygen-containing gas supply channel) 48. The air pump 46 has a stop valve (not shown) for interrupting supply of the air to the air supply channel 48. A humidifier 52 is provided for the air supply channel 48 at a position downstream of the air pump 46. A bypass channel 56 is provided between an air supply port and an air discharge port of the humidifier 52 for allowing the air to bypass the humidifier 52 through a valve 54. The water content in the air (off gas) discharged from the fuel cell stack 14 is supplied to the air supply channel 48 through a membrane of the humidifier 52 to humidify the fresh air. The air supply channel 48 is connected to the oxygen-containing gas supply passage 44a of the fuel cell stack 14. As long as the humidifier 52 can humidify the supplied air, structure of the humidifier 52 is not limited specially.

An air discharge channel (oxygen-containing exhaust gas discharge channel) 58 is connected to the oxygen-containing gas discharge passage 44b of the fuel cell stack 14. The humidifier 52, a stop valve 60, and a back pressure valve 62 are provided in series along the air discharge channel 58. An air circulation channel 64 is connected between the air supply channel 48 and the air discharge channel 58. One end of the air circulation channel 64 is connected between the humidifier 52 and the air pump 46, and the other end of the air circulation channel 64 is connected between the humidifier 52 and the stop valve 60. An oxygen pump 66 for circulation of oxygen is provided for the air circulation channel 64. The oxygen in the oxygen-containing gas is partially consumed at the cathode 34, and then, the oxygen-containing gas is discharged as an oxygen-containing exhaust gas from the fuel cell stack 14 to the air discharge channel 58.

The fuel gas supply apparatus 18 has a hydrogen tank 68 for storing high pressure hydrogen. This hydrogen tank 68 is connected to the fuel gas supply passage 42a of the fuel cell stack 14 through a hydrogen supply channel (fuel gas supply channel) 70. A stop valve 72 is provided for the hydrogen supply channel 70, and the hydrogen is supplied through the hydrogen supply channel 70 to the fuel cell stack 14. A pressure reducing valve (not shown) is provided somewhere in the hydrogen supply channel 70, for adjusting the pressure of the hydrogen.

An off gas channel (fuel gas exhaust gas discharge channel) 74 is connected to the fuel gas discharge passage 42b of the fuel cell stack 14. The fuel gas is partially consumed at the anode 32, and the partially-consumed fuel gas is discharged as a fuel exhaust gas from the fuel cell stack 14 to the off gas channel 74. A hydrogen discharge unit 76 is provided for the off gas channel 74. The hydrogen discharge unit 76 discharges the hydrogen to the outside. Though not shown, the hydrogen discharge unit 76 has a back pressure valve and a check valve.

A hydrogen circulation channel 78 is provided at a position upstream of the hydrogen discharge unit 76, and one end of the hydrogen circulation channel 78 is connected to the off gas channel 74. The other end of the hydrogen circulation channel 78 is connected to the hydrogen supply channel 70. A hydrogen pump 80 for hydrogen circulation is provided for the hydrogen circulation channel 78.

The fuel cell system 10 includes an energy storage device such as a battery 82. The fuel cell stack 14 and the battery 82 can supply electrical energy to loads such as a traction motor (not shown). As the energy storage device, instead of the battery 82, a capacitor, etc. may be adopted.

For example, the water content adjusting device 20 includes an impedance measuring device to detect the humidity and resistance value of the membrane electrode assembly 24. The water content in the membrane electrode assembly 24 is determined based on these detection values. The water content adjusting device 20 controls the opening angle of the valve 54 based on the determined water content to adjust the flow rate of the air bypassing the humidifier 52.

Operation of the fuel cell system 10 will be described below.

As shown in FIG. 1, the oxygen-containing gas (hereinafter also referred to as air) is supplied to the air supply channel 48 by operation of the air pump 46 of the oxygen-containing gas supply apparatus 16. This air is humidified when it passes through the humidifier 52, or this air bypasses the humidifier 52 through the bypass channel 56 by operation of the valve 54. Then, the air is supplied to the oxygen-containing gas supply passage 44a of the fuel cell stack 14.

In the meanwhile, in the fuel gas supply apparatus 18, the fuel gas (hereinafter referred to as the hydrogen gas) is supplied from the hydrogen tank 68 to the hydrogen supply channel 70 by operation of the stop valve 72. This hydrogen gas is supplied to the fuel gas supply passage 42a of the fuel cell stack 14.

The air flows from the oxygen-containing gas supply passage 44a into the oxygen-containing gas flow field 38 of the second separator 28, and the air is supplied to the cathode 34 of the membrane electrode assembly 24. In the meanwhile, the hydrogen gas flows from the fuel gas supply passage 42a to the fuel gas flow field 36 of the first separator 26. The hydrogen gas flows along the fuel gas flow field 36, and the hydrogen gas is supplied to the anode 32 of the membrane electrode assembly 24.

Thus, in each membrane electrode assembly 24, the oxygen in the air supplied to the cathode 34 and the hydrogen gas supplied to the anode 32 are partially consumed in electrochemical reactions at catalyst layers of the cathode 34 and the anode 32 for generating electricity.

Further, in a coolant supply apparatus (not shown), a coolant such as pure water, ethylene glycol, or oil is supplied to the coolant flow field 40 of the fuel cell stack 14.

Then, the air partially-consumed at the cathode 34 is discharged from the oxygen-containing gas discharge passage 44b to the air discharge channel 58. The air flows through the humidifier 52, and humidifies fresh air supplied from the air supply channel 48. Thereafter, the pressure of the air is adjusted to a preset pressure of the back pressure valve 62, and then, the air is discharged to the outside.

Likewise, the hydrogen gas supplied to the anode 32 is partially consumed at the anode 32. The partially-consumed hydrogen gas is discharged as a fuel exhaust gas from the fuel gas discharge passage 42b to the off gas channel 74. The fuel exhaust gas flows from the off gas channel 74 into the hydrogen circulation channel 78. By the operation of the hydrogen pump 80, the fuel exhaust gas is circulated into the hydrogen supply channel 70. As necessary, the fuel exhaust gas is discharged (purged) to the outside by operation of the hydrogen discharge unit 76.

Figure 2:
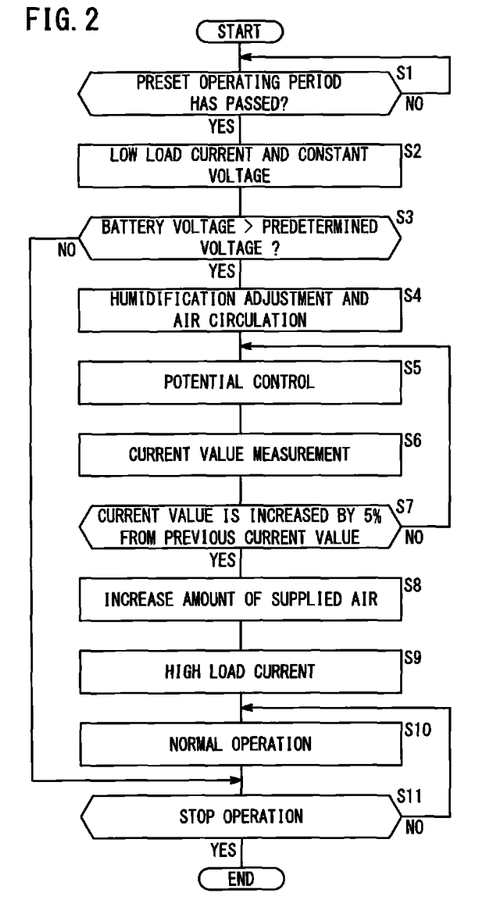
FIG. 2 is a flow chart for explanation of the operation method.

Next, an operation method according to the first embodiment of the present invention will be described with reference to a flow chart shown in FIG. 2.

In the control device 22, if it is determined that the operating period of the fuel cell system 10 exceeds a preset operating period (if it is determined that performance recovery of the fuel cell 12 should be started) (YES in step S1), the routine proceeds to step S2. For example, the preset operating period is a predetermined operating time interval, e.g., every other week. Preferably, the performance recovery control is performed at low load current during its initial operation. Further, the performance recovery control may be started after the power generation performance of the fuel cell 12 is degraded below a predetermined level.

Figure 3:
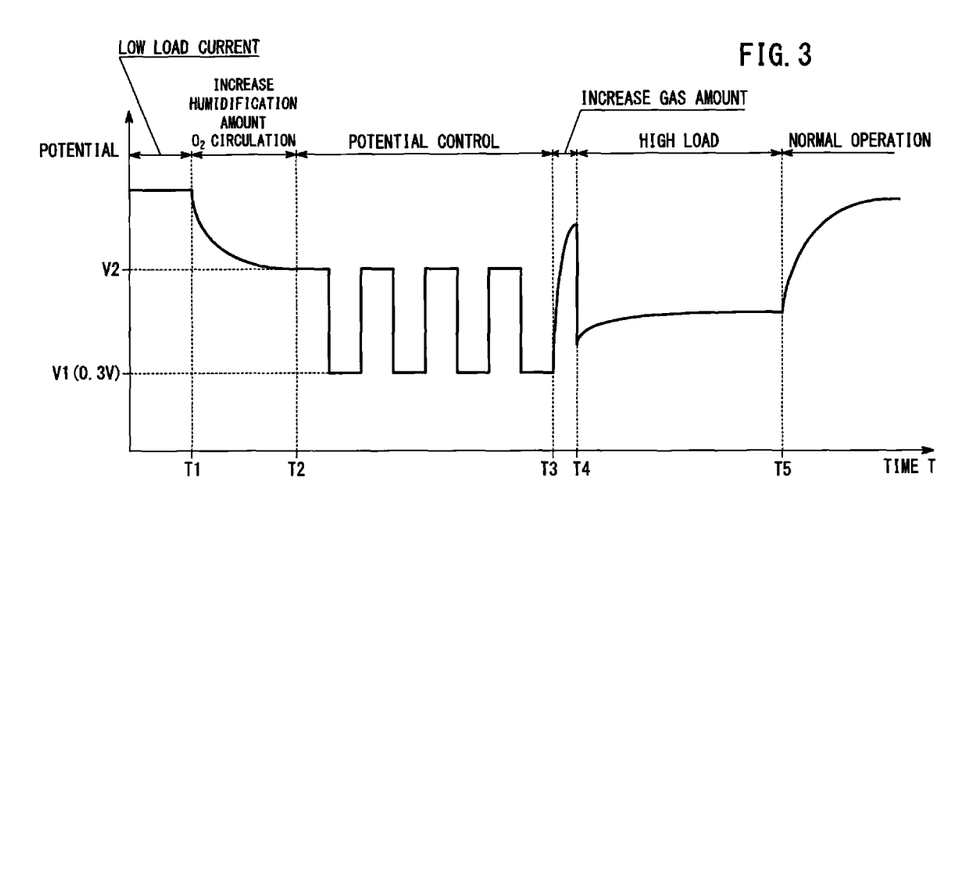
FIG. 3 is a graph showing the relationship between the potential and the time in the operation method.
Figure 4:
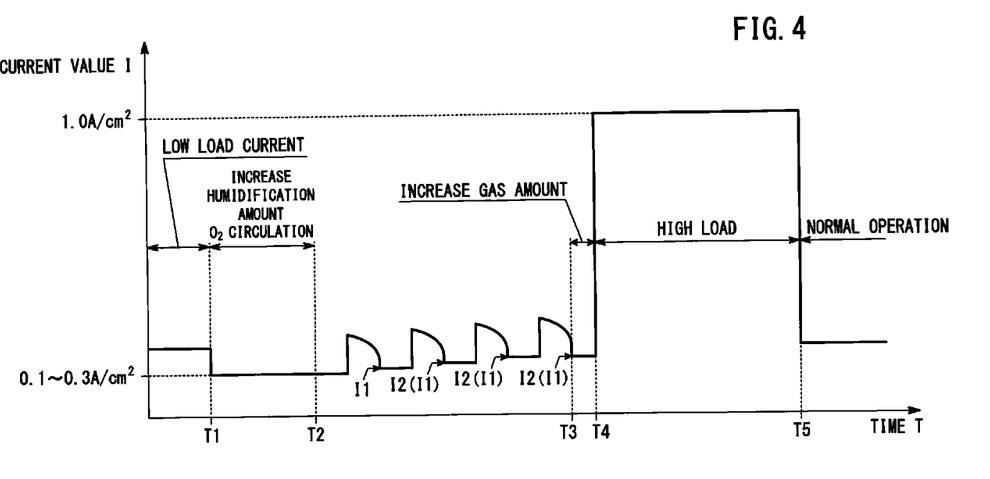
FIG. 4 is a graph showing the relationship between the current density and the time in the operation method.

In step S2, the fuel cell 12 is operated at the low load current, and at a constant voltage (see the period up to the time T1 in FIGS. 3 and 4). For example, the low load current is in a range of 0.1 to 0.3 A/cm$^2$. Then, the routine proceeds to step S3 to determine whether or not the remaining voltage of the battery 82 exceeds a preset voltage (predetermined voltage). This is because when there is a request to supply the electrical energy during implementation of the performance recovery control, it is necessary to output the requested electrical energy from the battery 82.

If it is determined that the battery voltage exceeds the preset voltage (YES in step S3), the routine proceeds to step S4 to start the process of humidification adjustment and oxygen circulation (air circulation) (see the period from the time T1 to the time T2 in FIGS. 3 and 4). Specifically, in the water content adjusting device 20, by decreasing the opening angle of the valve 54, the flow rate of the air bypassing the humidifier 52 to flow into the bypass channel 56 is decreased. Accordingly, the amount of the air supplied to, and humidified at the humidifier 52 is increased, and the water content in the fuel cell 12 is increased. Preferably, the relative humidity of the air is in the range of 80% to 100%.

Instead of using adjustment of the opening angle of the valve 54, for example, water content may be added using a nebulizer, an injector, etc. to humidify the air supplied to the fuel cell 12. Further, in the fuel gas supply apparatus 18, the supply of the fuel gas is performed as in the case of normal operation.

In the oxygen circulation process, the air pump 46 is rotated at low speed (or stopped). Further, in the state where the stop valve 60 is closed, the oxygen pump 66 is operated. Therefore, the oxygen-containing exhaust gas discharged from this fuel cell 12 is supplied again to the fuel cell 12 by circulation through the air circulation channel 64. In the structure, since the air is circulated through the closed air circulation channel 64, the oxygen is supplied to the fuel cell 12 at a low stoichiometric ratio in comparison with the case of the normal operation.

Then, as shown in FIG. 3, after the output voltage of the fuel cell 12 is maintained at a constant voltage, and the amount of the reactant gas is stabilized (see the time T2 in FIG. 3), potential control as the performance recovery control is started (step S5). In this potential control, the power generation voltage of the fuel cell 12 is maintained at 0.3 V or lower. In the fuel cell 12, low potential power generation control to maintain the potential at a low potential V1 (constant voltage) of 0.3 V or lower and high potential power generation control to maintain the potential at a high potential V2 (constant voltage) of higher than 0.3 V. e.g., in a range of 0.5 V to 0.7 V are repeated alternately by adjusting the load from the fuel cell 12. Preferably, the low potential V1 is in a range of 0.2 V to 0.3 V.

Specifically, after the high potential V2, e.g., the potential of 0.6 V is retained constantly for 10 seconds, the low potential V1 of 0.3 V is maintained for 10 seconds. This potential cycle is performed once, or a plurality of times. At this time, as shown in FIG. 4, the electric current value is measured (step S6). When the low potential V1 (0.3 V) is retained for 10 seconds, the current value I becomes 0.1 to 0.3 A/cm$^2$ at the low potential V1 (0.3 V) at which the current value I in the final part of 0.1 second in this 10 second period is measured, and the load current is low in comparison with the most frequent current range of the normal operation.

At this time, the previous (last) measured current value I1 is compared with the present measured current value I2. It is determined whether the present current value I2 is increased from the previous current value I1 by a predetermined value, e.g., 5% or more (step S7). The predetermined value depends on the degree of the performance to be recovered, and it is not limited to 5%. If it is determined that the ratio of the current value I2 to the current value I1 is greater than 1.05 (I2/I1>1.05) (YES in step S7), the performance recovery control is finished (see the time T3 in FIGS. 3 and 4).

Then, the routine proceeds to step S8 to increase the amount of the air to be supplied, to apply the high load current. Specifically, the rotation number of the air pump 46 is increased, the stop valve 60 is opened, and the oxygen pump 66 is stopped. Therefore, the oxygen-containing exhaust gas is not supplied to the fuel cell 12 by circulation through the air circulation channel 64. The fresh air is supplied to the fuel cell 12, and it is possible to increase the oxygen stoichiometric ratio. Further, by applying the high load current (step S9), (see the period from the time T4 to the time T5 in FIGS. 3 and 4), the power generation current value becomes high, and the water produced in the power generation is increased. Thus, it becomes possible to increase the water content in the solid polymer electrolyte membrane 30.

Thereafter, in the fuel cell system 10, the routine proceeds to perform normal operation (step S10). Then, by issuing an instruction to stop operation (YES in step S11), operation of the fuel cell system 10 is stopped.

In the first embodiment, when the performance recovery control is started, by circulating the air (oxygen-containing gas) in the closed air circulation channel 64, the air supplied to the fuel cell 12 is kept in an oxygen lean state having a lean oxygen concentration. Therefore, it becomes possible to set the power generation voltage of the fuel cell 12 to 0.3 V or lower (preferably, in a range of 0.2 V to 0.3 V). In particular, the sulfate ions can be removed from the catalyst surface easily. It is because if the power generation voltage exceeds 0.3 V, sulfate ions are retained on the catalyst surface, and sulfate ions cannot be removed easily.

In this regard, the water content adjusting device 20 supplies water to the membrane electrode assembly 24. Therefore, impurity ions such as sulfate ions removed from the catalyst surface is contained in the water, and discharged smoothly from the fuel cell 12. Accordingly, with the simple and economical structure, it is possible to remove impurity ions, and reliably maintain the desired power generation performance advantageously.

Further, in the fuel cell 12, low potential power generation control to maintain the potential at a low potential V1 of 0.3 V or lower and high potential power generation control to maintain the potential at a high potential V2 of higher than 0.3 V are repeated alternately. Accordingly, the potential is not retained at a low potential continuously over a long period of time, and it is possible to prevent degradation of the catalyst, etc. which may occur due to increase in the temperature.

Further, when the ratio of the current value I2 measured this time to the current value I1 measured last time becomes greater than 1.05 (I2/I1>1.05), the performance recovery control is finished. Accordingly, it becomes possible to determine whether or not the increase in the current value results from the influence of the errors, and it is possible to reliably detect the performance recovery.

Figure 5:
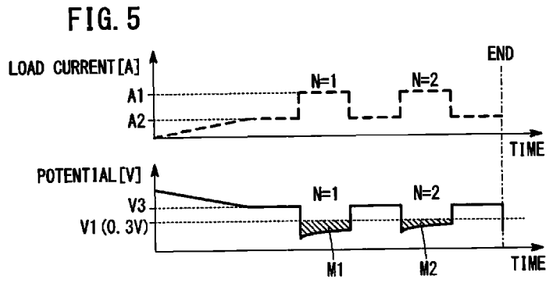
FIG. 5 is a graph showing performance recovery control in an operation method according to a second embodiment of the present invention.

Next, an operation method according to a second embodiment of the present invention will be described with reference to FIG. 5. As in the case of the first embodiment, the second to fifth embodiments use the fuel cell system 10, and adopt the step of determining whether or not performance recovery control of the fuel cell 12 should be started.

In the second embodiment, as the performance recovery control, variable voltage control is implemented at constant load current. In the third to fifth embodiments, the same control is implemented.

In the fuel cell 12, first load current control to maintain a constant load current value A1 (0.1 to 0.3 A/cm$^2$) for maintaining the power generation voltage of 0.3 V or lower and second load current control to maintain a constant load current value A2 (0.1 to 0.3 A/cm$^2$) which is smaller than the constant load current value A1 for maintaining the power generation voltage V3 of higher than 0.3 V are repeated alternately. At the time of the previous (N=1) performance recovery control, an area M1 is calculated as an integrated value of the power generation voltage of 0.3 V or lower. At the time of the present (N=2) performance recovery control, likewise, an area M2 is calculated as an integrated value of the power generation voltage of 0.3 V or lower.

Then, the previous area M1 and the present area M2 are compared with each other to determine whether the current area M2 is within 95% or within a predetermined range of the previous area M1. As a result, if it is determined that surface area M2/surface area M1≤0.95, the performance recovery control is finished. Then, as in the case of the first embodiment, after high load current is applied, the routine proceeds to perform normal operation.

As described above, in the second embodiment, the same advantages as in the case of the first embodiment are obtained. For example, by performing voltage variable control using constant load current, it is possible to reliably detect performance recovery.

Figure 6:
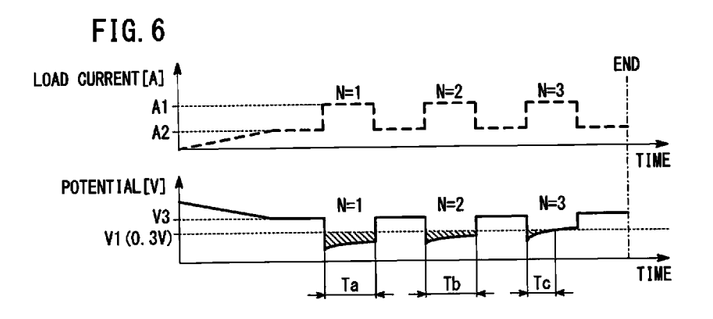
FIG. 6 is a graph showing performance recovery control in an operation method according to a third embodiment of the present invention.

Hereinafter, an operation method according to a third embodiment of the present embodiment will be described with reference to FIG. 6.

In the fuel cell 12, first load current control to maintain the constant load current value A1 for maintaining the power generation voltage of 0.3 V or lower and second load current control to maintain the constant load current value A2 for maintaining the power generation voltage V3 of higher than 0.3 V are repeated alternately. At the time of the first (N=1) performance recovery control, a retention period Ta for retaining the power generation voltage of 0.3 V or lower is obtained, and at the time of the second (N=2) performance recovery control, a retention period Tb for retaining the power generation voltage of 0.3 V or lower is obtained. Further, at the time of the third (N=3) performance recovery control, a retention period To for retaining the power generation voltage of 0.3 V or lower is obtained.

If it is determined that the second retention period Tb is not within 95% or not within a predetermined range of the first retention period Ta, the third retention period Tc is compared with the first retention period Ta. As a result, if it is determined that the retention period Tc/retention period Ta≤0.95, the performance recovery control is finished. Then, as in the case of the first and second embodiments, after high load current is applied, the routine proceeds to perform normal operation.

As described above, in the third embodiment, the same advantages as in the case of the first and second embodiments are obtained. For example, by performing voltage variable control using constant load current, it is possible to reliably detect performance recovery.

Figure 7:
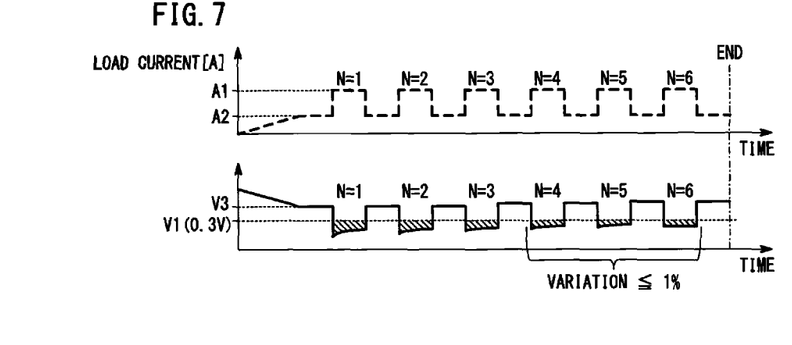
FIG. 7 is a graph showing performance recovery control in an operation method according to a fourth embodiment of the present invention.

Hereinafter, an operation method according to a fourth embodiment of the present embodiment will be described with reference to FIG. 7.

In the fuel cell 12, first load current control to maintain the constant load current value A1 for maintaining the power generation voltage of 0.3 V or lower and second load current control to maintain the constant load current value A2 for maintaining the power generation voltage V3 of higher than 0.3 V are repeated alternately. In the performance recovery control, comparison of the integrated value described in connection with the second embodiment and comparison of the retention period described in connection with the third embodiment are performed repeatedly.

Then, in the previous several measurements, e.g., in the previous three measurements, it is determined whether or not a variation of the predefined parameters (integrated value or retention period) is within 1%. If it is determined that the variation is within 1%, performance recovery control is finished. As in the case of the first to third embodiments, after high load current is applied, the routine proceeds to perform normal operation.

As described above, in the fourth embodiment, the same advantages as in the cases of the first to third embodiments are obtained. For example, by performing voltage variable control using constant load current, it is possible to reliably detect performance recovery.

Figure 8:
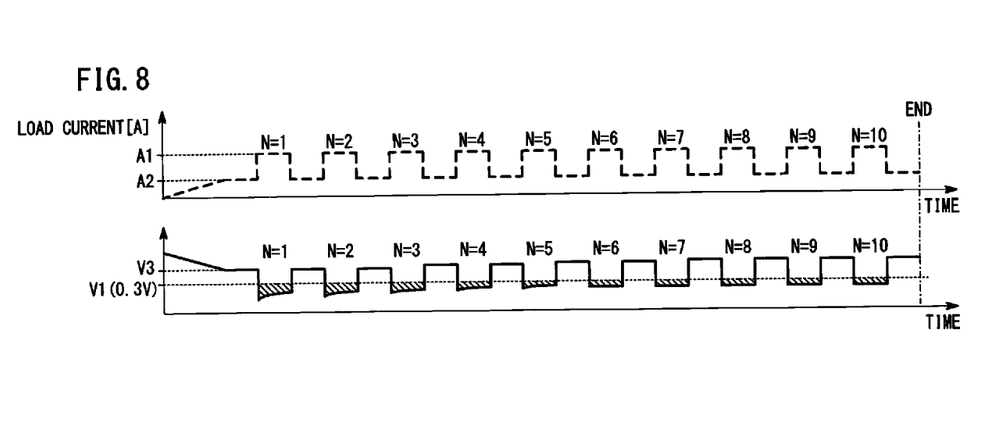
FIG. 8 is a graph showing performance recovery control in an operation method according to a fifth embodiment of the present invention.

Next, an operation method according to a fifth embodiment will be described with reference to FIG. 8.

In the fuel cell 12, first load current control to maintain the constant load current value A1 for maintaining the power generation voltage of 0.3 V or lower and second load current control to maintain the constant load current value A2 for maintaining the power generation voltage V3 of higher than 0.3 V are repeated alternately. In the performance recovery control, comparison of the integrated value described in connection with the second embodiment and comparison of the retention period described in connection with the third embodiment are performed repeatedly.

Then, after performance recovery control is performed a predefined number of times, e.g., ten times (N=10), the performance recovery control is finished. Further, as in the cases of the first to fourth embodiments, after high load current is applied, the routine proceeds to perform normal operation.

As described above, in the fifth embodiment, the same advantages as in the cases of the first to fourth embodiments are obtained. For example, by performing voltage variable control using constant load current, it is possible to reliably detect performance recovery.

While the invention has been particularly shown and described with reference to preferred embodiments, it will be understood that variations and modifications can be effected thereto by those skilled in the art without departing from the scope of the invention as defined by the appended claims.

What is claimed is:

1. A method of operating a fuel cell system, the fuel cell system comprising:
   a fuel cell having a membrane electrode assembly, the membrane electrode assembly including an anode, a cathode, and a solid polymer electrolyte membrane interposed between the anode and the cathode, the fuel cell configured to generate electrical energy by electrochemical reaction of a fuel gas supplied to the anode and an oxygen-containing gas supplied to the cathode,
   a fuel gas supply apparatus configured to supply the fuel gas;
   an oxygen-containing gas supply apparatus configured to supply the oxygen-containing gas, and allowing the oxygen-containing gas to be circulated through a closed circulation channel connected to the cathode; and
   a water content adjusting device configured to adjust water content of the oxygen-containing gas prior to being circulated through the closed circulation channel connected to the cathode by controlling a humidification ratio, which is a ratio of an amount of the oxygen-containing gas exposed to humidification to an amount of the oxygen-containing gas not exposed to humidification,
   the method comprising the steps of:
   determining that performance recovery control of the fuel cell should be started;
   upon determining that the performance recovery control should be started, increasing water content to be supplied to the membrane electrode assembly by the water content adjusting device by operating a control valve to increase the humidification ratio of the oxygen-containing gas prior to being circulated through the closed circulation channel connected to the cathode, while maintaining power generation voltage of the fuel cell at 0.3 V or lower in a state where an entirety of the oxygen-containing gas is circulated through the circulation channel temporarily.

2. The operation method according to claim 1, wherein in the fuel cell, low potential control to maintain a potential at constant voltage of 0.3 V or lower and high potential power generation control to maintain the potential at a constant voltage of higher than 0.3 V are repeated alternately.

3. The operation method according to claim 2, further including a step of measuring electrical current, and wherein if it is determined that the present current value detected in present low potential power generation control is higher than previous current value detected in last low potential power generation control by a predetermined value or more, the performance recovery control is finished.

4. The operation method according to claim 1, wherein, in the fuel cell, first load current control to maintain a constant load current value for maintaining power generation voltage of 0.3 V or lower and second load current control to maintain a constant load current value for maintaining the power generation voltage of higher than 0.3 V are repeated alternately.

5. The operation method according to claim 4, wherein if it is determined that an integrated value of voltage of 0.3 V or lower detected in the present first load current control is within a predefined range of an integrated value of the voltage of 0.3 V or lower detected in the previous first load current control, the performance recovery control is finished.

6. The operation method according to claim 4, wherein if it is determined that a period of retaining the voltage of 0.3 V or lower detected in the present first load current control is within a predefined range of a period for retaining the voltage of 0.3 V or lower detected in the previous first load current control, the performance recovery control is finished.

7. The operation method according to claim 4, wherein if it is determined that a variation of the integrated values of voltage of 0.3 V or lower or a variation of periods of retaining the voltage of 0.3 V or lower detected a plurality of times up to the time of the previous first load current control is within a predefined range, the performance recovery control is finished.

8. The operation method according to claim 4, wherein if it is determined that the first load current control and the second load current control are preformed repeatedly a predefined number of times, the performance recovery control is finished.

9. The operation method according to claim 1, wherein the closed circulation channel includes a circulation pump.

* * * * *